(12) United States Patent
Rhodes

(10) Patent No.: US 7,743,498 B2
(45) Date of Patent: Jun. 29, 2010

(54) METHOD OF PROCESSING SEALS LIKE LEAF SEALS

(75) Inventor: Nigel Anthony Rhodes, Newbold Verdon Leicestershire (GB)

(73) Assignee: ALSTOM Technology Ltd., Baden (CH)

( * ) Notice: Subject to any disclaimer, the term of this patent is extended or adjusted under 35 U.S.C. 154(b) by 360 days.

(21) Appl. No.: 11/538,094

(22) Filed: Oct. 3, 2006

(65) Prior Publication Data

US 2007/0119909 A1 May 31, 2007

Related U.S. Application Data

(63) Continuation of application No. PCT/EP2005/051708, filed on Apr. 19, 2005.

(30) Foreign Application Priority Data

Apr. 23, 2004 (DE) ......................... 10 2004 020 377

(51) Int. Cl.
*B21D 53/84* (2006.01)
(52) U.S. Cl. ...................... 29/888.3; 148/516; 148/656; 277/355
(58) Field of Classification Search ............... 29/888.3; 277/313, 357, 312, 355; 148/516, 656
See application file for complete search history.

(56) References Cited

U.S. PATENT DOCUMENTS

| | | | |
|---|---|---|---|
| 6,120,622 A | 9/2000 | Mayr et al. | |
| 6,267,381 B1 * | 7/2001 | Wright | 277/355 |
| 6,343,792 B1 | 2/2002 | Shinohara et al. | |

(Continued)

FOREIGN PATENT DOCUMENTS

DE 19641375 12/1997

(Continued)

OTHER PUBLICATIONS

Pending Claims for U.S. Appl. No. 11/538,100 as of Nov. 25, 2008.

(Continued)

*Primary Examiner*—Rick K Chang
(74) *Attorney, Agent, or Firm*—Cermak Nakajima LLP; Adam J. Cermak

(57) ABSTRACT

A method of processing seals (20), like leaf seals, in which seals (20) an annular gap, formed between two coaxial, cylindrical surfaces, is sealed off in the axial direction by a multiplicity of individual, thin sealing elements (22; 22a, b) which, with an orientation deviating from the radial direction, extend transversely through the gap and are fixed at their end assigned to the one cylindrical surface and bear loosely with the other, free end against the other cylindrical surface. An improvement in the sealing geometry is achieved in a simple manner in that, for the uniform orientation of the free ends of the sealing elements (22; 22a, b), in a first step, the sealing elements (22, 22a, b) are brought to bear with their free ends against a coaxial cylindrical surface having a predetermined diameter (D) in such a way that they are subjected to a bending stress, and in that, in a second step, the sealing elements (22; 22a, b) subjected to the bending stress are subjected to a heat treatment in such a way that the bending stress is completely removed.

7 Claims, 4 Drawing Sheets

U.S. PATENT DOCUMENTS

| | | |
|---|---|---|
| 6,553,639 B2 | 4/2003 | Hobbs et al. |
| 6,860,484 B2 | 3/2005 | Urlichs |
| 6,874,788 B2 | 4/2005 | Kono |
| 6,935,631 B2 | 8/2005 | Inoue |
| 7,047,638 B2 | 5/2006 | Eldridge et al. |
| 7,201,378 B2 | 4/2007 | Kono |
| 2004/0232621 A1 | 11/2004 | Kono |
| 2007/0085277 A1 | 4/2007 | Rhodes et al. |
| 2007/0102886 A1 | 5/2007 | Uehara et al. |
| 2007/0261225 A1 | 11/2007 | Hogg et al. |

FOREIGN PATENT DOCUMENTS

| | | |
|---|---|---|
| DE | 19745184 | 4/1999 |
| EP | 0933567 | 8/1999 |
| EP | 1013975 | 6/2000 |
| EP | 1302708 | 4/2003 |
| EP | 1365181 | 11/2003 |
| EP | 1489340 | 6/2004 |
| EP | 1479953 | 11/2004 |
| EP | 1489340 | 12/2004 |
| GB | 2021210 | 11/1979 |
| WO | WO03/072287 | 9/2003 |
| WO | WO2005/103534 | 11/2005 |
| WO | WO2005/103535 | 11/2005 |
| WO | WO2005/103536 | 11/2005 |

OTHER PUBLICATIONS

Pending Claims for U.S. Appl. No. 11/538,104 as of Nov. 25, 2008.
Most recent Office Action for U.S. Appl. No. 11/538,100 dated Apr. 25, 2008.
Most recent Office Action for U.S. Appl. No. 11/538,104 dated Aug. 7, 2008.
Search Report for German Patent App. No. 10 2004 020 377.6 (Feb. 28, 2005).
International Search Report for PCT Patent App. No. PCT/EP2005/051708 (Jun. 30, 2005).
International Preliminary Examination Report for PCT Patent App. No. PCT/EP2005/051708 (Aug. 18, 2006).

* cited by examiner

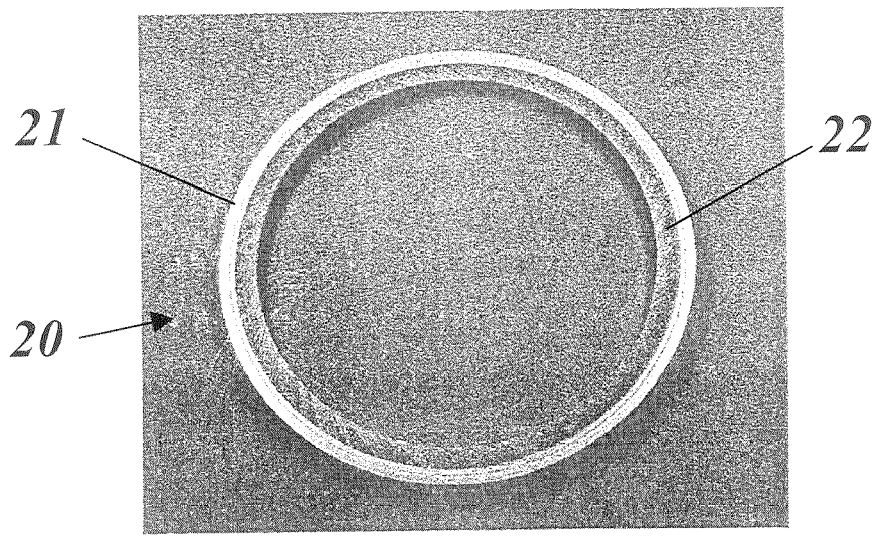
*Fig. 7*
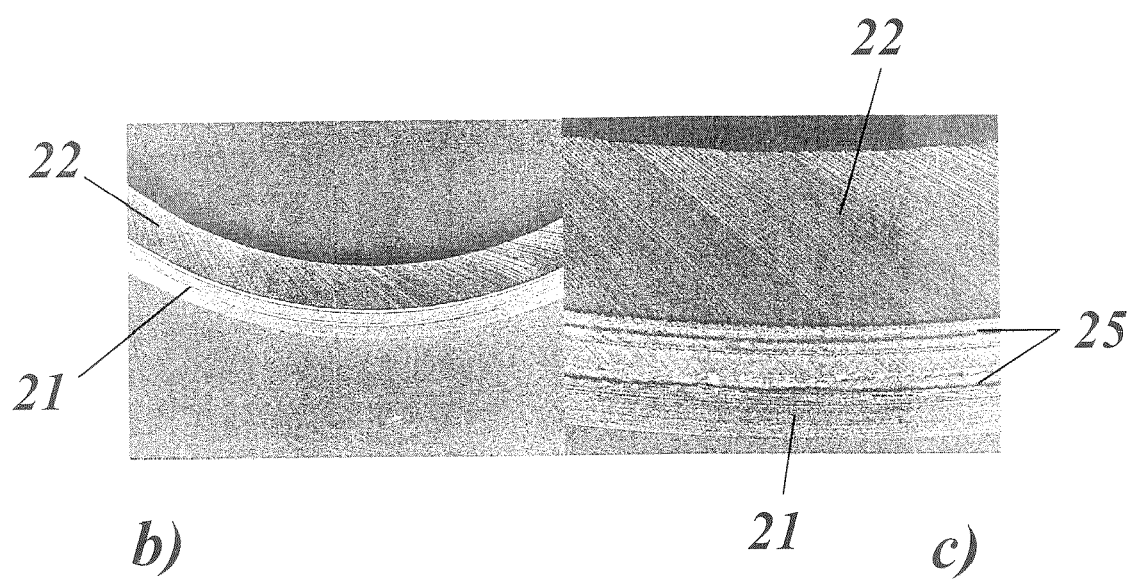

METHOD OF PROCESSING SEALS LIKE LEAF SEALS

This application is a Continuation of, and claims priority under 35 U.S.C. §120 to, International application number PCT/EP2005/051708, filed 19 Apr. 2005, and claims priority therethrough under 35 U.S.C. §119 to German application no. 10 2004 020 377.6, filed 23 Apr. 2004, the entireties of which are incorporated by reference herein.

BACKGROUND OF THE INVENTION

1. Field of the Invention

The present invention relates to the field of sealing in rotating machines, and it relates to the processing of seals, like leaf seals, as used in gas turbines, for example.

2. Brief Description of the Related Art

A gas turbine includes a rotor, on which various stages with compressor blades and turbine blades are provided, and of a stator housing. The rotor is mounted in bearings at each end of the rotor shaft.

The control of the gas flow inside the gas turbine is of paramount importance with regard to both the functionality and the effectiveness. Sealing techniques are used at various locations along the rotor shaft in order to reduce the axial gas flow along the shaft. This is especially important next to the bearings in order to prevent the oil which is used in the bearings from overheating due to the hot gases of the gas flow.

Two types of sealing techniques are traditionally used in this situation—usually alternatively, sometimes also in combination. These are labyrinth seals and brush seals.

Labyrinth seals have no metal-to-metal contact between the rotor and the stator; the sealing effect is therefore relatively small. However, they offer the advantage of low rotational friction and of a therefore virtually unlimited service life.

On the other hand, brush seals have higher friction losses on account of the friction between the bristle ends and the rotor shaft. This results in wear, which limits the service life of the seal. However, brush seals stem the axial gas flow more effectively, in particular in the case of higher axial pressure differences.

The use of these techniques for sealing in gas turbines has numerous restrictions. First, the axial pressure difference that they can withstand is still fairly low. In the case of the brush seals, this is due to the bristles, which have the same stiffness in the axial and circumferential directions: high pressures can cause the bristles to yield in the axial direction. The capability of the seals to allow a significant radial movement and to resist it is also low.

The design of a brush seal is often a compromise between the use of a supporting plate, which is intended to give sufficient axial support, and the non-restriction of the radial movement.

In order to avoid the disadvantages of the known brush seals, a leaf seal has been proposed in U.S. Pat. No. 6,343,792, this leaf seal performing the same function as either a labyrinth seal or a brush seal but having the advantages of both. Instead of the bristles, which are produced from wires of circular cross section, thin metal leaves are assembled in a certain arrangement (see, for example, FIG. 3 of U.S. Pat. No. 6,343,792 or FIG. 1 of the present application). The leaves, which are oriented with their surfaces essentially parallel to the axial direction, are much stiffer in the axial direction than in the circumferential direction. Thus the seal can withstand higher pressure differences without restricting their possibilities for allowing radial movements. The wide region on the rotor, which is swept by the tips of the leaves, provides the opportunity of producing a hydrodynamic force during operation, and this hydrodynamic force can separate the leaf tips from the shaft. In this way, a distance of a few microns can be produced and maintained, so that the wear, the friction heat and the friction losses can be reduced virtually to zero.

The basic design relates to a number of thin metal leaves which have a controlled air gap between them and are fastened at a predetermined angle to the radius. The air gap is a critical design parameter: it enables an air flow to occur in order thus to produce the hydrodynamic effect; however, it must not be so large as to allow an excessive axial air flow.

Two variants of leaf spring designs are possible: in the one variant, the leaves are blown downward, but in the other they are blown upward. In the variant having the leaves blown downward, there is a distance between the leaf tips and the shaft during the assembly and start-up, and this gap is reduced to very small values by the use of an air flow between the leaves. On the other hand, in the variant having the upward blowing, there is slight mutual influencing between the leaf tips and the shaft during the start-up, and a distance is produced when the shaft is accelerated. In both cases, the flow of the medium through the air gaps between the leaves is critical, as is the control of the seal's inside diameter, which is produced by the leaf tips.

The air flow through the leaves can be varied by using a front and a rear plate which leave a narrow gap free between the surfaces of the leaf stack and the plates (see abovementioned FIGS. 1 and 3). A careful design of these geometries makes it possible to control the upward or downward blowing effects. It may also be desirable to assist the downward blowing effect by an active pressure feed along the length of the leaves or inward from the front side or from the rear directions.

One of the other main advantages of the leaf seal concept is a greater tolerance of the radial movement than in labyrinth or brush seals. This requires a large distance there between the inside diameter of the front and rear end plates and the shaft.

Depending on the geometry selected for the seal and on the diameter of the shaft to be sealed, the number of leaves can be several thousand or many thousand. The accuracy with which these leaves can be assembled and connected, in the course of which a reproducible air gap between each pair of leaves is ensured, is critical for the successful implementation of every possible seal design.

The joining method for fixing the leaves in their position could be a mechanical technique, such as clamping in place, welding or brazing or any possible combination thereof. It is quite obviously important that a minimum disturbance of the leaves or of their relative positions occurs during the joining process.

If local defects in the leaves should nonetheless occur during the production of leaf seals or during subsequent use, it would be desirable to correct these defects in a simple manner in order to ensure the full sealing function of the seals.

U.S. Pat. No. 6,120,622 proposes, in the case of seals of the brush type, bringing the initially radially oriented bristles into the desired inclined position in that they are initially bent in a chosen direction by insertion of a rotating conical mandrel, and in that they are then heat-treated in order to make the bend permanent, so that it persists even after removal of the mandrel.

GB-A-2 021 210 also provides for heat treatment of brushes of a brush seal, which brushes have been brought into the desired bent shape by mechanical stress.

SUMMARY OF THE INVENTION

One aspect of the present invention therefore includes a method of processing leaf seals or comparable seals with which deviations of the leaves or of comparable sealing elements from the optimum geometrical arrangement can be corrected in a simple and reliable manner in order to give the seals their full functionality or restore their full functionality.

Another aspect of the present invention includes the fact that, for the uniform orientation of the free ends of the leaves or sealing elements, in a first step, the leaves or sealing elements are brought to bear with their free ends against a coaxial cylindrical surface having a predetermined diameter in such a way that they are subjected to a bending stress, and, in a second step, the leaves or sealing elements subjected to the bending stress are subjected to a heat treatment in such a way that the bending stress is completely removed. Due to the thermally induced reduction of the bending stresses, the leaves or sealing elements are optimally and permanently adapted to the cylindrical surface having a predetermined diameter, different positions of the individual leaves or sealing elements being evened out with regard to the surface. As a result, the free ends of the leaves or sealing elements lie on a common circle having a diameter essentially the same as the predetermined diameter.

Sealing elements processed in this exemplary method are preferably made of metal or a metal alloy. In this case, the sealing elements may be designed in particular as wires, and the seal is a brush seal.

However, the sealing elements may also be designed as leaves, and the seal is a leaf seal, the leaves preferably being fixed at their outer ends, and the arrangement with the leaves, in the first step, being pushed over a coaxially oriented mandrel which has at least one cylindrical section, the outside diameter of which is essentially the same as the predetermined diameter.

If the leaves for forming the seal are welded to an encircling housing or backing ring on the outside, the processing steps serving for the uniform orientation of the free ends of the sealing elements are carried out after completion of the welding process.

If the leaves for forming the seal are brazed to an encircling housing or backing ring on the outside, the processing steps serving for the uniform orientation of the free ends of the sealing elements are carried out during the brazing process.

In this case, it may be advantageous for the two processing steps to be carried out repeatedly with a gradually increased predetermined diameter.

The method can be carried out in an even simpler manner if a mandrel is used which has a conical section adjoining the cylindrical section, and if the arrangement with the leaves, in the first step, is pushed over the conical section onto the mandrel.

BRIEF DESCRIPTION OF THE DRAWINGS

The invention is to be explained in more detail below with reference to exemplary embodiments in connection with the drawing, in which:

FIG. 7 shows, in three partial illustrations, the photographs of the leaf seal from FIG. 6 after the processing according to the invention, in the overall illustration (FIG. 7a), and in two differently enlarged details (FIGS. 7b and 7c).

DETAILED DESCRIPTION OF EXEMPLARY EMBODIMENTS

Figure 1:
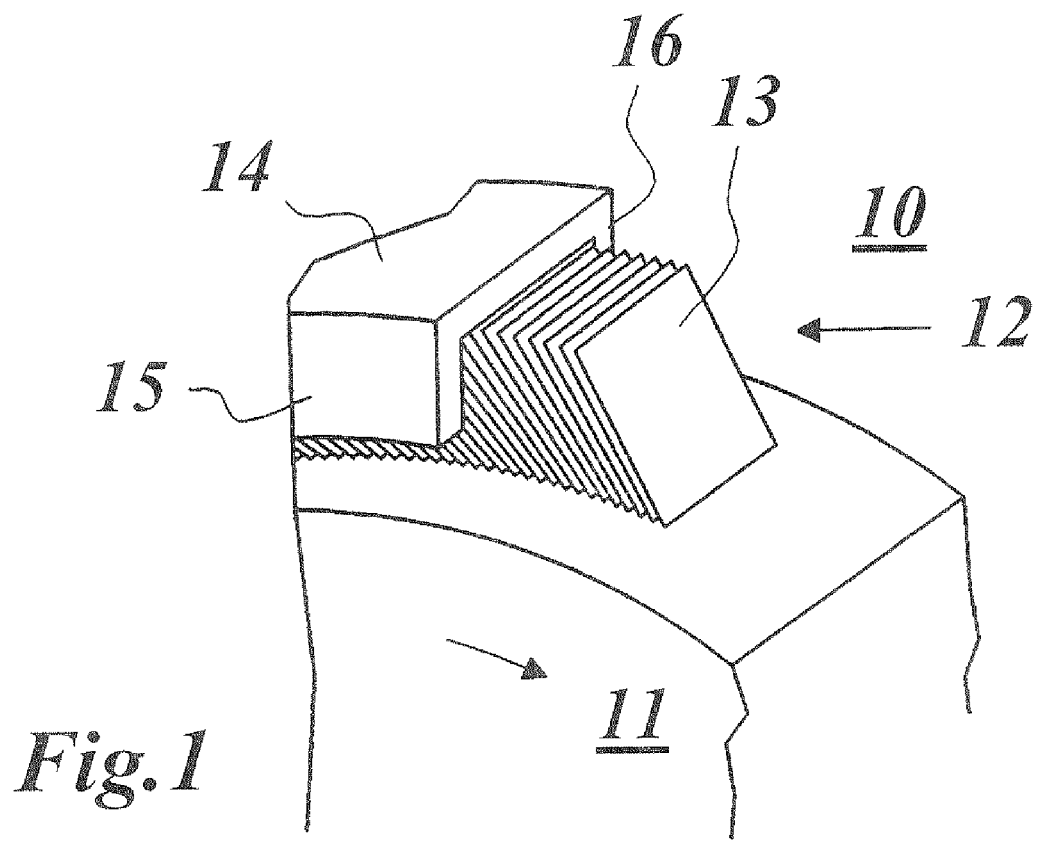
FIG. 1 shows a perspective side view of the typical construction of a leaf seal as used in a gas turbine.
Figure 2:
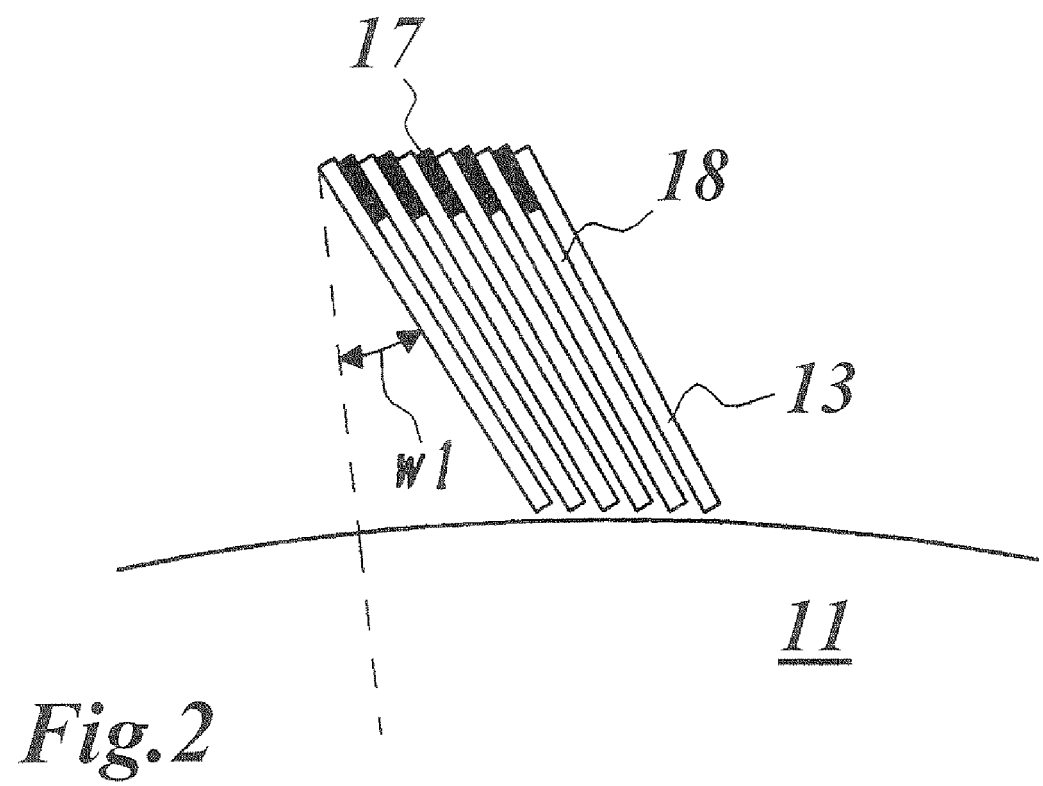
FIG. 2 shows, in the axial direction, the side view of the arrangement, inclined from the radial direction, of individual leaves with their intermediate spacers.

Shown in FIG. 1 in a perspective side view is the typical construction of a leaf seal as used in a gas turbine. The leaf seal 12 seals a rotor shaft 11, rotating in the arrow direction, of the gas turbine 10 with respect to a housing 14. A stack of tightly spaced-apart thin leaves 13 is arranged in a ring in the annular intermediate space between the rotor shaft 11 and the housing 14. With their surface, the leaves 13 are oriented parallel to the axis of rotation of the machine. According to FIG. 2, the leaves are tilted from the radial direction by an angle w1 and have a narrow gap or intermediate space 18 between them, which is preferably established by spacers 17 arranged between the leaves 13. The spacers 17 of FIG. 2 are shown as separate elements. However, they may also be integrated in the leaves.

Figure 3:
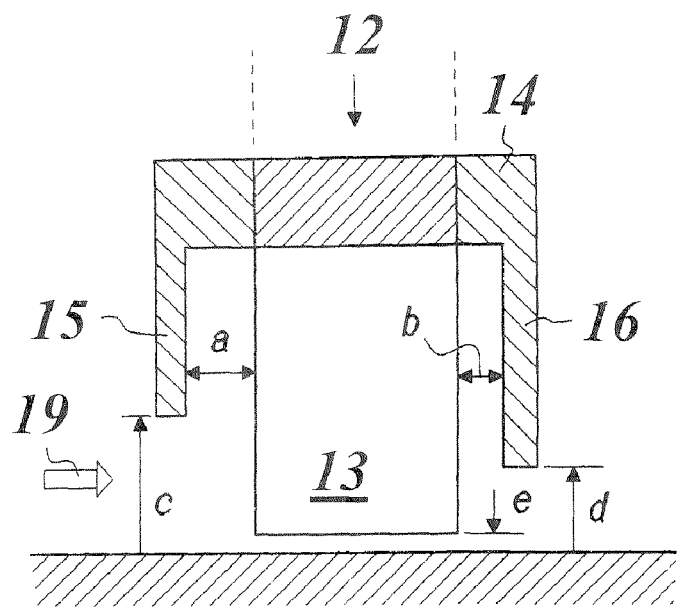
FIG. 3 shows the view of a leaf seal, comparable with FIG. 1, in the circumferential direction, with a front and a rear end plate.

According to FIGS. 1 and 3, the air flow through the leaves 13 can be varied by using a front and a rear end plate 15 and 16, respectively, which leave a narrow gap free between the surfaces of the leaf stack and the end plates 15, 16 (distances a and b in FIG. 3). A careful design of these geometries makes it possible to control the aforementioned upward or downward blowing effects. It may also be desirable to assist the downward blowing effect by an active pressure feed along the length of the leaves or inward from the front side or from the rear directions.

One of the other main advantages of the leaf seal concept shown in FIG. 1 or 3 is a greater tolerance of the radial movement than in labyrinth or brush seals. This requires a large distance between the inside diameter of the front and rear end plates 15, 16 and the rotor shaft 11 (distances c and d in FIG. 3). The gap between the leaves 13 and the rotor shaft (distance e in FIG. 3) is only a few microns.

The present invention relates to a method of processing such leaf seals, which in particular can form a step of the entire manufacturing process for the production of leaf seals. Once the leaves have been assembled and connected in their positions to form a ring, to be precise either by welding, brazing or another method, a heat-treatment process is used in this case for the processing.

If the leaves within the seal are to be joined by brazing, the heat treatment can be suitably incorporated in the brazing cycle with regard to the heat-treatment properties of the relevant alloys. However, if a welding process is used, a heat-treatment process downstream of the welding may be necessary in order to ensure suitable properties of the alloys used.

Otherwise, a separate heat-treatment cycle which has no damaging effects on the alloys involved or on the brazed or welded joints should be developed.

Figure 4:
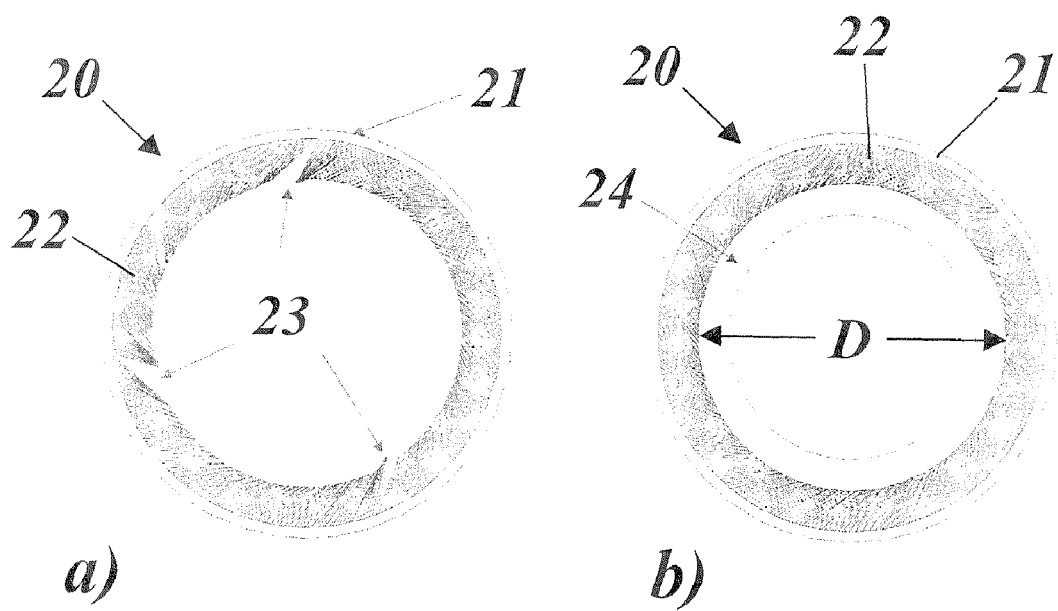
FIG. 4 shows, as viewed in two partial figures in the axial direction, the locally disturbed orientation of the leaves of an exemplary leaf seal before the final processing according to the invention (FIG. 4a) and after being pushed onto a corresponding cylindrical mandrel (FIG. 4b)

The geometry of the leaves in the seal, as results from the way in which the leaves are put together and from their joining, is shown typically as in FIG. 4a. The individual leaves 22 are firmly joined inside the leaf seal 20 in an orientation deviating from the radial direction (see angle w1 in FIG. 2) with an encircling backing ring 21 on the outside (by welding, brazing, or the like). In the course of the production method, local geometrical disturbances 23 occur during the orientation of the leaves 22, and these geometrical disturbances 23, if they are not removed, would considerably restrict the sealing effect.

For the abovementioned heat treatment for removing these disturbances, a circular-cylindrical mandrel 24 is now inserted according to FIG. 4b into the interior of the leaf stack, the outside diameter D of this mandrel 24 being the same as the desired inside diameter of the leaf stack, a certain thermal expansion being quite permissible.

Figure 5:
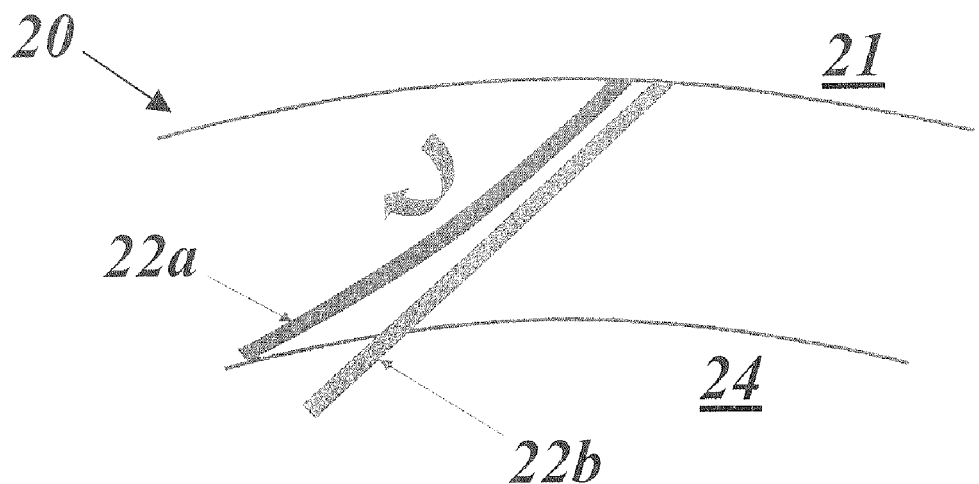
FIG. 5 shows, in a schematic side view, the individual leaves subjected to a bending stress by the mandrel.

At this point of the process, there should be contact between each leaf tip and the mandrel surface. This produces a bending stress in the individual leaves 22, as shown in FIG. 5. Whereas the leaves without the pushed-in mandrel 24 assume the orientation characterized in FIG. 5 by the leaf 22b, the leaves, taking the leaf 22a as an example, are subjected to a bending stress by the pushed-in mandrel 24.

Each leaf is bent somewhat into a curved shape (see curved arrow in FIG. 5) on account of the bending stress. Of course, the inside diameter of the leaf seal 20 before the heat treatment must be smaller than the desired inside diameter D after the heat treatment in order to ensure the contact between the leaf tips and the mandrel surface. The magnitude of the undersize of the leaf seal is related to the curvature remaining after the heat treatment of the leaves. These considerations should already be included in the design stage of the seal.

The temperature at which the heat treatment is carried out and the duration of the heat treatment should be selected in such a way that a marked stress relief occurs in the leaves 22. In this way, after cooling, when the mandrel 24 is still pushed in, the bending stresses are reduced virtually to zero. This includes the fact that the contact force between each leaf tip and the mandrel surface is also virtually zero. If the mandrel 24 is then removed, the leaves remain in their new shape and position. This results in their free ends producing an exact replica of the mandrel surface. Since some of the differences in the inside diameter have also been produced by fluctuations in the setting angle around the ring, the setting angle is then substantially more uniform than before the heat treatment and there is also a more consistent air gap.

Figure 6:
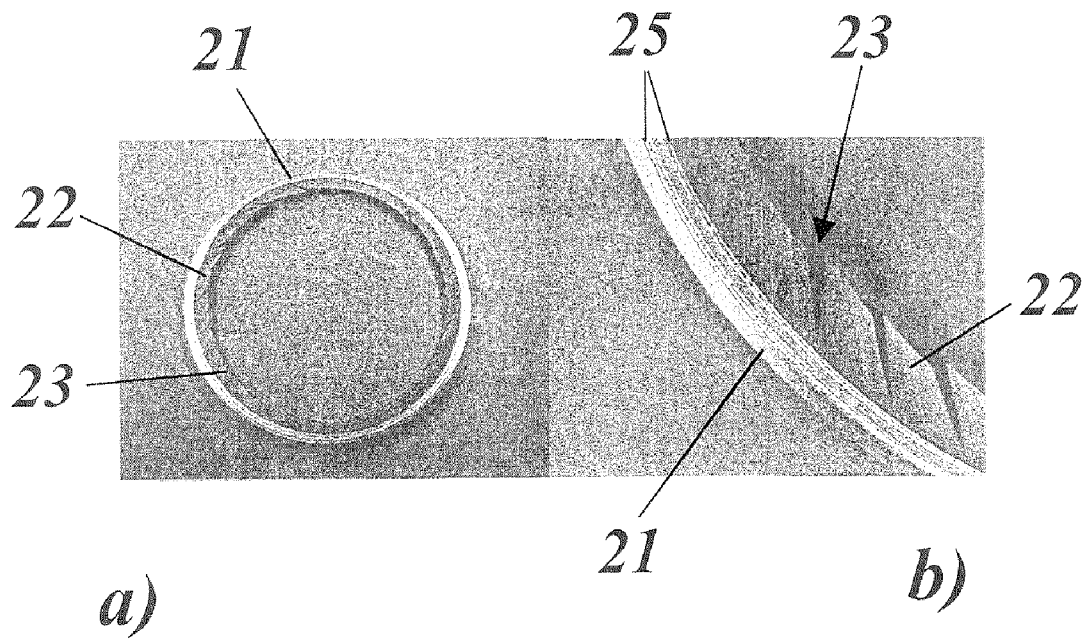
FIG. 6 shows, in two partial illustrations, the photographs of an exemplary leaf seal with leaves welded to a backing ring and locally disturbed leaf geometry in the overall illustration (FIG. 6a) and in an enlarged detail (FIG. 6b)

Shown in FIGS. 6 and 7 are some photographs which represent the effect of the heat treatment on a leaf stack welded at a backing ring 21 by means of welds 25. The geometrical disturbances 23 in the leaf stack can clearly be seen in the photograph of FIG. 6 taken before the heat treatment.

According to FIG. 7, after the heat treatment, the welded ring shows a substantially more uniform setting angle and also other geometrical properties and a smooth inner surface formed by the free ends of the leaves 22. A slight curvature of the leaves 22 can be seen here.

Maintaining the concentricity and the coaxiality of the inside and outside diameters is critical for the functionality of the leaf stack 21, 22. Once the latter has been correctly positioned in the heat-treatment furnace, suitable fastening means may be used in order to ensure that no movement takes place and that the correct concentricity is maintained during the heat-treatment cycle. A clamping device designed for the specific purpose can position the mandrel 24 and the leaf stack 21, 22 together.

In the present case of FIGS. 6 and 7, the mandrel 24 used had a tapered (conical) section with a narrower diameter in order to make it easier to push the leaf stack 21, 22 over it. Once it had been pushed over it, the leaf stack 21, 22 was then pushed down the mandrel 24 until it reached a cylindrical section, which ensured a constant diameter over the axial length of the leaf stack.

The use of a method embodying principles of the present invention enables the inside diameter of the leaf stack 21, 22 to be changed after the operational test. Initial tests should use the smallest possible inside diameter, which is then gradually increased by repetition of the heat-treatment process with mandrels or diameters of increasing size.

On the whole, methods in accordance with the present invention can be distinguished by one or more of the following features:

- A heat-treatment process removes deviations in the geometrical position of the leaves of a leaf seal and ensures an accurate and reproducible inner surface, to be precise by relief of bending stresses in the leaves during the heat treatment in order to bring their geometry into a new equilibrium position.
- The use of a mandrel having an outside diameter approximately equal to the desired inside diameter of the resulting leaf stack produces the inner surface of the leaf stack, this inner surface being determined by the free ends of the leaves.
- The abovementioned process may be combined with a simultaneous brazing cycle for fastening the leaves after forming the leaf stack; if the leaves are welded, the heat treatment is effected after the welding, as is necessary for the welded alloys.
- The use of fastenings and clamping devices ensures that the inner cylindrical surface and the outer cylindrical surface of the leaf stack are concentric, and are coaxial within the tolerances.
- The method may be part of the production of leaf seals; however, it may also be part of a service or maintenance program carried out at certain service intervals, and may possibly comprise a cleaning process.
- The method may also be applied to other seals such as brush seals or any other components where reduction of stresses which are caused by an oversized mandrel makes possible an increase in the accuracy and conformity of the geometries produced.

LIST OF DESIGNATIONS

10 Gas turbine
11 Rotor shaft
12, 20 Leaf seal
13, 22 Leaf
14 Housing
15, 16 End plate
17 Spacer (separate)
18 Gap (intermediate space)
19 Gas flow
21 Backing ring
22a, b Leaf
23 Geometrical disturbance
24 Mandrel
25 Weld
a-e Distance
D Diameter
w1 Angle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of processing seals, in which seals an annular gap formed between two coaxial, cylindrical surfaces is sealed off in the axial direction by a multiplicity of individual, thin sealing elements which, with an orientation deviating from the radial direction, extend transversely though the gap and are fixed at an end assigned to one cylindrical surface and bear loosely with another, free end against the other cylindrical surface, the method comprising:

first providing a seal with a plurality of individual, thin, planar sealing elements each having two ends and a sealing element plane, the sealing element plane extending in a direction which deviates from the radial direction and is fixed at one of said two ends;

second, for the uniform orientation of the free ends of the sealing elements, bringing to bear the sealing elements with their free ends against a coaxial cylindrical surface having a predetermined diameter so that they are subjected to a bending stress; and third, heat treating the sealing elements subjected to the bending stress so that the bending stress is completely removed, wherein the sealing elements comprise leaves and the seal comprises a leaf seal and the leaves are fixed at their outer ends, and wherein bringing the sealing elements to bear comprises pushing the arrangement with the leaves over a coaxially oriented mandrel which has at least one cylindrical section, the outside diameter of which mandrel is essentially the same as the predetermined diameter.

2. The method as claimed in claim 1, wherein the sealing elements are made of metal or a metal alloy.

3. The method as claimed in claim 1, wherein the sealing elements comprise wires and the seal comprises a brush seal.

4. The method as claimed in claim 1, further comprising:
   welding the leaves for forming the seal to an encircling housing or backing ring on the outside, before said bringing the sealing elements to bear and said heat treating.

5. The method as claimed in claim 1, further comprising:
   brazing the leaves for forming the seal to an encircling housing or backing ring on the outside, at the same time as one of said bringing the sealing elements to bear and said heat treating.

6. The method as claimed in claim 1, further comprising:
   repeatedly performing said bringing the sealing elements to bear and said heat treating with a gradually increased predetermined diameter.

7. The method as claimed in claim 1, wherein the mandrel comprises a conical section adjoining the cylindrical section, and wherein bringing the sealing elements to bear comprises pushing the sealing elements over the conical section onto the mandrel.

* * * * *